United States Patent

Karnowski et al.

[11] Patent Number: 5,251,125
[45] Date of Patent: Oct. 5, 1993

[54] USER INTERFACE FOR A PROCESS CONTROL DEVICE

[75] Inventors: Thomas A. Karnowski, Olonomowoc; Fred W. Haselow, Watertown; Richard L. Rejret, Watertown; Edwin C. Witte, Watertown, all of Wis.

[73] Assignee: Eaton Corporation, Cleveland, Ohio

[21] Appl. No.: 516,165

[22] Filed: Apr. 30, 1990

[51] Int. Cl.⁵ .................... G05B 19/42; G09G 3/02
[52] U.S. Cl. ........................ 364/189; 364/146; 345/172; 345/146
[58] Field of Search .............. 364/188, 189, 146; 340/712, 747

[56] References Cited

U.S. PATENT DOCUMENTS

| | | | |
|---|---|---|---|
| 4,232,548 | 11/1980 | Baumoel | 73/861.28 |
| 4,308,754 | 1/1982 | Pedersen et al. | 73/861.28 |
| 4,570,217 | 2/1986 | Allen et al. | 364/188 |
| 4,586,035 | 4/1986 | Baker et al. | 340/712 |
| 4,634,426 | 1/1987 | Kamen | 604/65 |
| 4,646,250 | 2/1987 | Childress | 364/518 |
| 4,679,137 | 7/1987 | Lane et al. | 364/188 |
| 4,698,625 | 10/1987 | McCaskill et al. | 340/709 |
| 4,708,022 | 11/1987 | Johnson | 73/861.28 |
| 4,787,252 | 11/1988 | Jacobson et al. | 73/861.28 |
| 4,797,834 | 1/1989 | Honganen et al. | 364/510 |
| 4,811,240 | 3/1989 | Ballou et al. | 364/518 |
| 4,821,211 | 4/1989 | Torres | 364/521 |
| 4,992,929 | 2/1991 | Yamada et al. | 364/187 |
| 5,062,052 | 10/1991 | Sparer et al. | 364/189 X |

OTHER PUBLICATIONS

"BatchTrol" Installation & Operating Instructions dated Feb., 1987.
"Masstrol" Installation & Operating Instructions dated May, 1987.
Advertising hand-out for "AMIE" Controller, (admitted prior art by applicant).

Primary Examiner—Jerry Smith
Assistant Examiner—Paul Gordon
Attorney, Agent, or Firm—Watts, Hoffmann, Fisher & Heinke Co.

[57] ABSTRACT

A user interface including a dual navigational menu system forming part of a configuration or programming procedure in a process control device such as a flow controller. The controller includes key pad by which the user enters instructions and data into the device, a display for displaying alphanumeric information and a key pad monitoring means for detecting a predetermined user input indicating that a configuration mode is desired. When in the configuration mode, the pressing of direction keys is detected to sequentially advance through a menu system comprised of a matrix of menu items arranged in rows and columns. Means is also provided for detecting the entry of position data which operates to directly select a given menu item to obviate the need for sequentially advancing through all prior items in order to reach the desired menu item. When a given menu item is activated, random access memory forming part of the device is used to store data entered by the user. A help system is also implemented including a key designated as a "help key" which displays context sensitive information for an activated menu item whenever the "help" key is pressed.

6 Claims, 4 Drawing Sheets

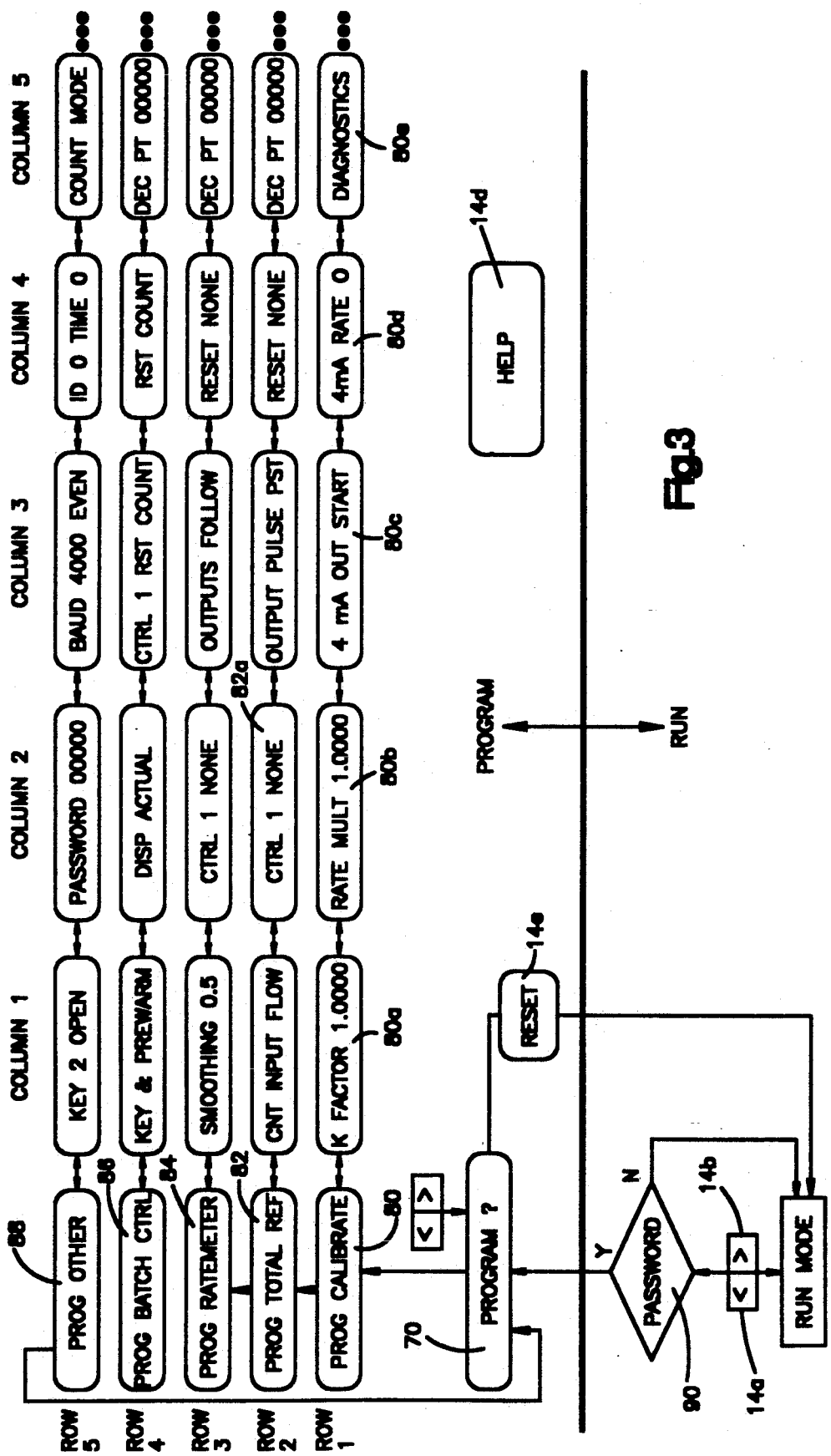

USER INTERFACE FOR A PROCESS CONTROL DEVICE

TECHNICAL FIELD

The present invention relates generally to process control devices and in particular to a new and improved user interface for configuring or programming a flow controller.

BACKGROUND ART

Process control devices such as flow controllers are used extensively in industry to control and monitor processes. In particular, flow controllers are used to monitor the flow of fluid in a conduit. Sophisticated versions of these devices may control batch processes in which a supply conduit is monitored to determine the volume of fluid delivered per unit time. This information may then be used to control valving for precisely metering a quantity of fluid to a container or process. For these applications, the flow controller is typically coupled to a flow meter mounted to the conduit and receives flow information in the form of pulses. The unit counts the pulses and based on the counts per unit time, determines the flow rate and/or the volume of fluid delivered.

Process control devices including flow controllers are currently available which are, in effect, programmable to enable a given flow controller to work with a variety of flow meters and in a wide variety of applications. Many of these flow controllers, accept not only pulse inputs for determining flow rates, but also accept temperature information in order to compensate for changes in fluid viscosity in their volume calculations. These devices may also include control devices such as relays for controlling peripheral devices such as control valves The programming ability of some of the prior controllers enabled the device to be "tailored" to the process or application. For example, multiplying and/or scaling factors, communication protocols, and peripheral interfaces are usually different in every application and must be specifically configured. With prior devices, configuring the controller for the application it is to be used in, could be time consuming and difficult. In some cases, obscure control codes needed to be entered. In many, if not most cases, the operating manual had to be consulted in order to determine the codes that needed to be entered.

In more recent flow control devices, a "setup" program has been implemented which includes a series of prompts that are displayed by the system, which asks the user for parameters or other information that is needed for the configuration. In some devices, this is termed a configuration menu. In order to program the controller, the user is required to cycle sequentially through each setup step even if minor changes to the current setup are necessary.

DISCLOSURE OF THE INVENTION

The present invention provides a new and improved method and apparatus for configuring a process control device such as a flow controller. According to a broad aspect of the invention, the device includes a user interface having a "dual navigational" menu system by which the controller is configured or programmed. The menu system is configured as a matrix with the menu items arranged in rows and columns.

According to the preferred embodiment of the invention, the controller includes a keyboard by which a user inputs instructions and data, a display for displaying program prompts and/or data and an internal memory for storing the controller software and the data entered by the user. The controller, under the control of the stored program, monitors the keyboard. When a particular key or key combination is pressed by the user, the device switches from a "run" mode to a "configuration" or programming mode which enables the user to access the menu system.

According to this feature of the invention, individual menu items in the menu system can be accessed sequentially by pressing "direction" control keys or directly by entering position or address information to indicate which item in the matrix should be activated. If the menu items are accessed sequentially, "row traversing" and "column traversing" keys on the keyboard are pressed by the user in order to advance through the menu vertically and horizontally, respectively.

In the preferred and illustrated embodiment, each menu item may be accessed directly by entering the row and column position of the menu item. With this feature, changes in the controller configuration can be effected quickly without requiring that the user cycle through each menu item until the menu item of interest is reached.

According to another feature of the invention, a help message system is provided which is operative to display context sensitive information regarding the selected menu item. When the controller is in the configuration mode, one of the keys on the keyboard is designated as a "help" key (during the run mode, it may have another function). Whenever this "help" key is pressed by the user, the system retrieves text stored in internal memory of the controller for the selected menu item and displays and/or scrolls the information in the controller display.

According to still another feature of the invention, when the unit is first switched into the configuration mode, a prompt is displayed. If a "directional" key is pressed, the first menu item is selected. Alternately, if numeric information in the form of row and column digits is entered, the menu item corresponding to the position entered is then immediately activated bypassing all intermediate menu items.

With the disclosed "dual navigational" controller configuration system, a convenient and intuitive user interface is implemented which enables a user of the device to easily change the parameters and other application dependent data stored within the controller. Changes to the configuration can be implemented quickly by enabling the user to directly access a menu item in the matrix without requiring the user to sequential advance through the entire menu system.

Additional features of the invention will become apparent and a fuller understanding obtained by reading the following detailed description made in connection with the accompanying drawings.

BRIEF DESCRIPTION OF THE DRAWINGS

FIG. 3 is a schematic representation of a dual navigational menu system and user interface forming part of the flow controller.

BEST MODE FOR CARRYING OUT THE INVENTION

Figure 1:
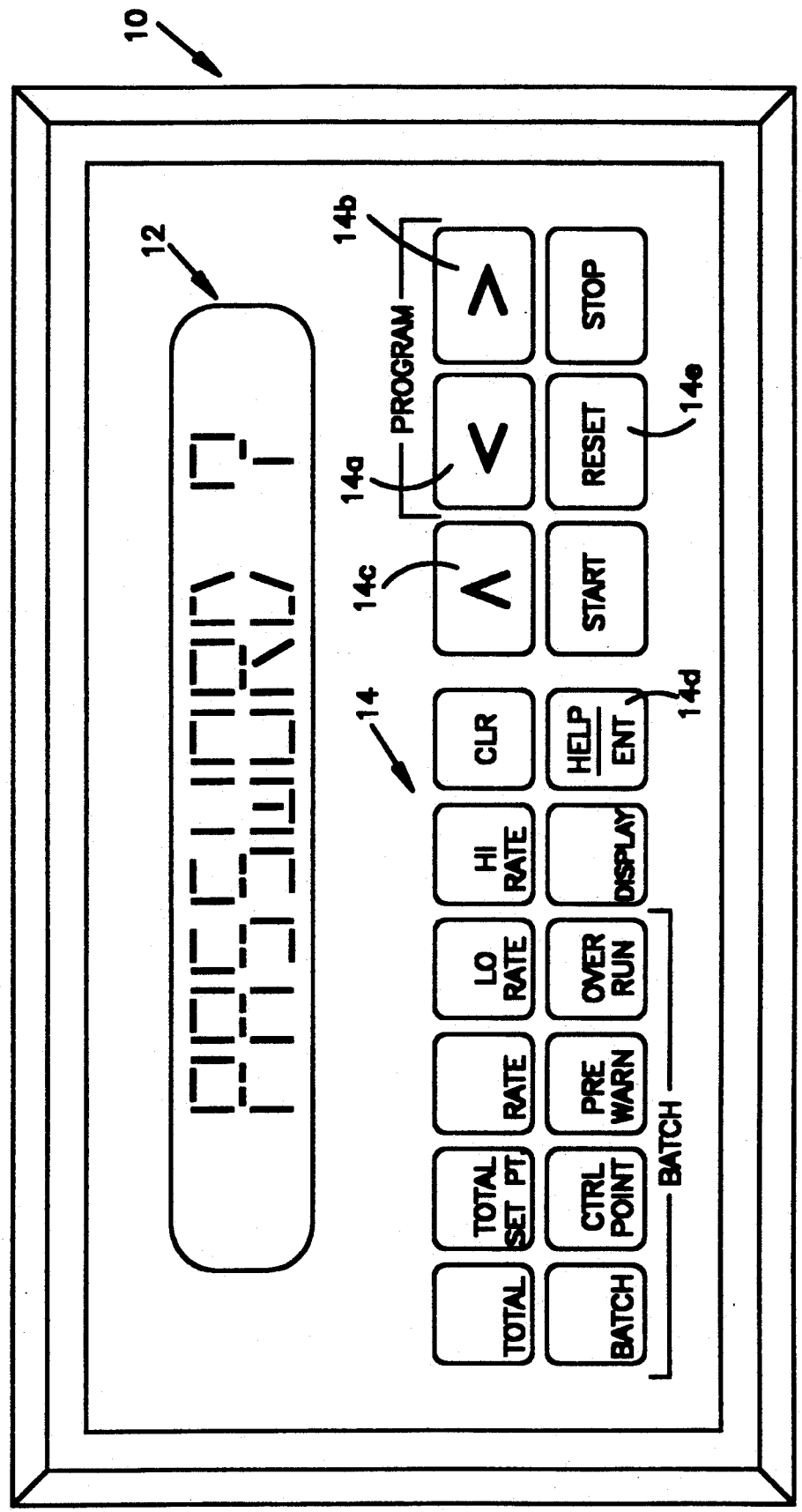
FIG. 1 illustrates the front panel of a flow controller embodying the present invention.

FIG. 1 illustrates a control panel 10 of a flow controller embodying the present invention. The panel includes a display 12. In the illustrated controller, the display is a single line alpha-numeric display which, for example, may display sixteen characters at a time. A keypad 14 is positioned below the display 12 and in the illustrated embodiment comprises 18 individual keys. It should be noted here, that the invention should not be limited to the illustrated panel configuration since the principles of the invention are adaptable to a wide variety of devices and may be implemented using a variety of control panel configurations.

The control device is operable in either a "run" mode or a "configuration" or "programming" mode. In the run mode, the user enters commands or sets process parameters using the 12 keys positioned to the left in FIG. 1. The illustrated controller can be used in a batch mode in which the operator may select a quantity of fluid to be delivered to a container or other process. The control unit monitors the flow using a flow meter (not shown) and by the use of switches, relays, etc. controls the opening and closing of remotely located valves in order to regulate the filling of a container, delivery of fluid to a process, etc.

The above-described operator controls and the control functions provided by the controller are considered conventional and do not form part of the present invention. In addition, the present invention can be adapted to devices having substantially different control functions and operator controls.

The flow controller is switched to a "configuration" or "programming" mode to enable the user to configure the controller for the application it is being used in. For example, parameters relating to the type of flow meter being used, the functions to be performed by the controller upon receipt of control signals via control inputs and the programming of alarm limits and communication protocols, may form part of the setup data that is inputted by the user.

Figure 2A:
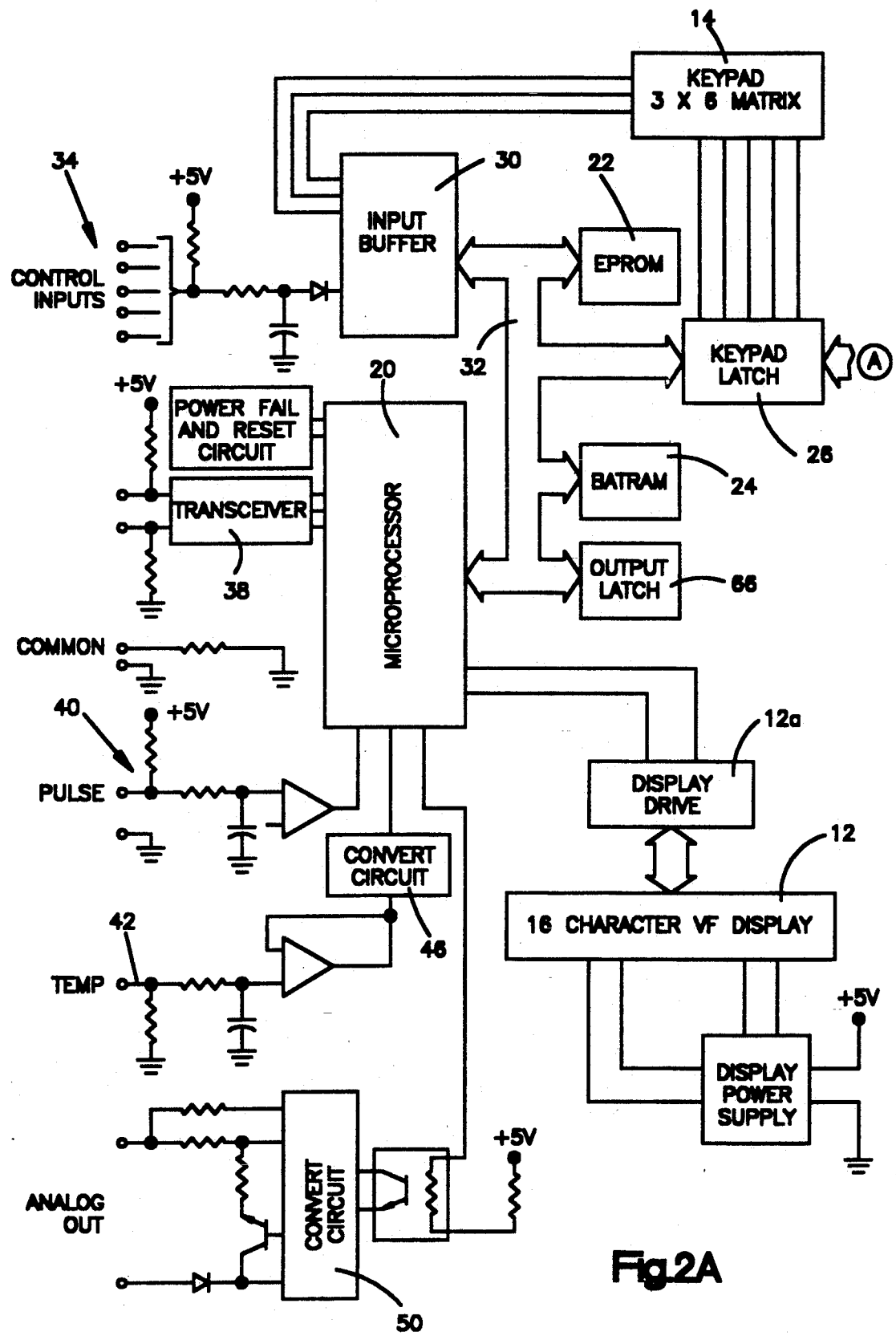
FIGS. 2A, 2B together illustrate a schematic of a control circuit forming part of the flow controller shown in FIG. 1.
Figure 2B:
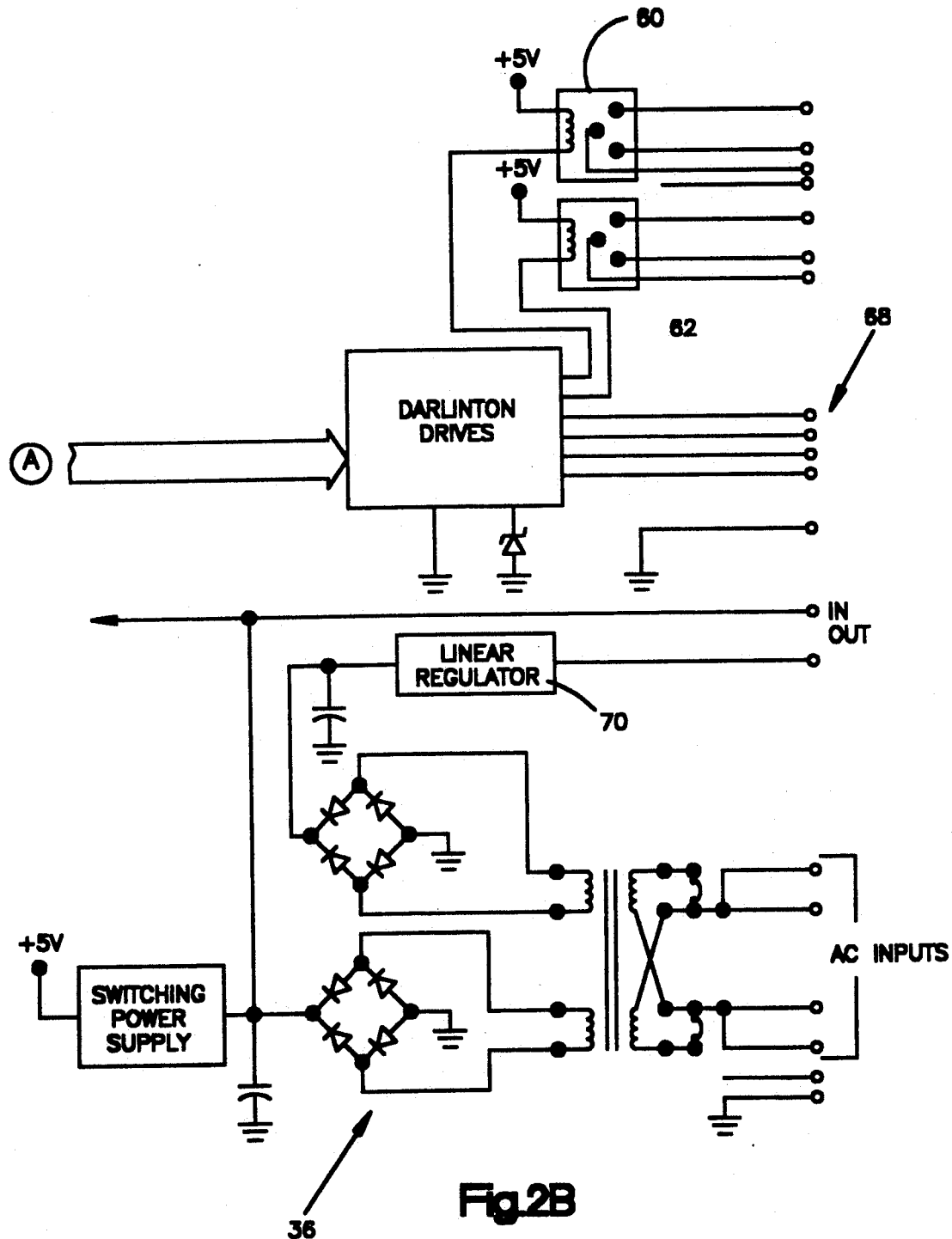

Referring to FIGS. 2A, 2B, the preferred control circuit is microprocessor based and includes a CPU 20. The CPU 20 operates under the control of a program stored in EPROM 22. Data and configuration parameters are stored in battery backed-up random access memory (batram) 24. The batram 24 maintains its information even if power is terminated to the unit. The keypad 14 is arranged in a 3×6 matrix. An input buffer 30 strobes the input signals from the keypad 28 onto a microprocessor data bus 32 using a conventional keypad latch 26. The input buffer 30 also strobes input signals from a plurality of programmable control inputs 34. The control inputs may be programmed to cause the execution of predetermined instructions by the microprocessor 20 when a signal from a remote device, is received.

A conventional switching power supply 36, connected to an AC line, provides power for the control circuit and the display 12. The display 12 is driven by a display drive 12a under the control of the CPU 20. Provision is also made for serial communication with outside devices using an RS-485 transceiver 38 which acts as a buffer between the outside communication line and the CPU 20.

In the illustrated embodiment, the CPU 20 receives flow meter data in the form of pulses through an input 40. The relationship between the pulse frequency and the flow rate in a conduit is determined usually by the type of flow meter being used. The relationship is typically one of the parameters that must be stored in the controller.

The disclosed circuit also has provision for receiving temperature information from a suitable temperature probe (not shown). In the illustrated embodiment, temperature information is received at a temperature input 42 and is converted to a frequency by a frequency to voltage convertor circuit 46. The CPU 20 measures the frequency to determine the temperature data being received at the input 42. The temperature information may be used by the controller to compensate for viscosity changes in the fluid being monitored. The temperature input can also provide compensated flow measurement information.

The circuit includes a provision for outputting an analog signal related to, in the case of a flow controller, the flow rate being monitored. The analog output, is generated by a conversion circuit 50 which converts a pulse-width-modulated output signal from the CPU 20 to a 4-20 milliamp current output signal. The analog output circuit is optically isolated from the microprocessor signal using a conventional optical isolator. In the disclosed embodiment, the level of the analog output signal is programmable by the user using the disclosed controller configuration system. The analog output can also be digitally calibrated during the "configuration" mode.

The control of external devices such as control valves is achieved using a pair of switching devices such as relays 60, 62. The activating and deactivation of the relays is controlled by the microprocessor 20 and an output latch 66 which communicates with the CPU data bus 32.

Other outputs, indicated generally by the reference character 68, are also provided which under the control of the output latch, can output a signal for an "overrun alarm" indicating that the quantity of fluid delivered has exceeded the desired amount, a totalizer count as well as information relating to high and low flow rates. A "rate high" and "rate low" output may be used to trigger alarms should the monitored flow rate be less than or greater than a predetermined rate, respectively. These disclosed functions are considered conventional in a flow controller.

The circuit also provides for an output power connection via a linear regulator 70. This power output may be used to power a peripheral device such as a flow meter or temperature probe (not shown).

According to the invention, a user interface having a dual navigational menu system forms part of the device control software and is preferably stored in the EPROM 22. In the preferred embodiment, the user gains access to the menu system and configuration procedure by pressing one or more predetermined keys on the keypad 14. In the disclosed embodiment, the program mode is activated by simultaneously pressing direction or arrow keys 14a, 14b. The CPU 20 under the control of the control program stored in the EPROM 22 recognizes the simultaneous actuation of the arrow keys 14a, 14b and immediately begins executing a configuration or set-up procedure stored in the EPROM 22.

In the preferred embodiment of the user interface and set-up procedure, the configuration menu system is arranged as a matrix of menu items which may be accessed sequentially or directly, if the user enters position or address information when prompted. Referring to FIG. 3, the menu items are arranged in a plurality of rows and columns. When the program mode is first activated (by simultaneously pressing arrow keys 14a, 14b), a starting menu block 70 is activated and a prompt such as a "?" appears in the display 12 indicating that the device is now in a configuration mode and is awaiting input from the user. The keypad 14 is monitored for key presses. If digits, corresponding to a row, column position of a given menu item are entered, the CPU, recognizing the entered data as position information, immediately activates the menu item corresponding to the row and column digits entered by the user. If instead, a vertical arrow key 14c is pressed, a first menu item 80 is activated. The CPU 20 then continues to monitor the keyboard buffer 30 for key presses. Pressing either transverse arrow keys 14a, 14b (but not both) will cause the next adjacent menu item i.e. 80a to be activated. If the vertical arrow key 14c is pressed, a menu item 82, vertically adjacent the menu item 80 is activated.

According to a feature of the control system, if the transverse arrow keys 14a, 14b are simultaneously pressed, the program immediately returns to the starting menu block 70 and redisplays the prompt "?" message in the display 12.

According to another feature of the invention, one of the keys 14d is designated as a "help" key when the controller is in the configuration mode. When the "help" key 14d is pressed, an explanatory or descriptive message regarding the menu item that is currently active is retrieved from the EPROM 22 and is sent to the display 12. The message scrolls across the display 12 and provides information to the user, regarding the menu item that is currently selected. This facilitates programming and set up of the device and reduces the need for instruction manuals, etc. when configuration or modifications to configuration parameters are needed.

When a modification to the stored parameters or configuration is needed, the present invention enables a user to directly access a menu item that requires modification. Unlike the prior art, the user is not required to advance through each menu item until a desired menu item is activated. With the disclosed invention, the user merely presses the transverse arrow keys 14a, 14b to activate the configuration mode. In response to the initial prompt ("?") in the display 12, the user enters digits corresponding to the row, column position of the menu item desired. The program immediately activates the selected menu item enabling the user to enter the desired change.

The configuration mode is exited by pressing a predetermined key on the keypad 14. In the disclosed embodiment, a reset key 14e serves this function. During the configuration mode, the keyboard input is monitored. Actuation of the reset key 14e by the user, is recognized by the CPU 20 which immediately switches the controller from the configuration mode to the run mode.

The specific menu items shown in FIG. 3, should be considered examples of the type of information and parameters that can be entered into a flow control device having the disclosed user interface. In this embodiment of the invention, the menu blocks in the leftmost column designated 80, 82, 84, 86 and 88 act as identifiers or generic descriptions for the menu items in their associated row. In other words, when one of the blocks 80, 82, 84, 86, 88 are activated, the user does not enter data or parameters. The user must advance to one of the laterally adjacent menu items in the associated row.

For example, when the user selects the menu block 80 by pressing the key 14c in response to the program prompt "?", the "program calibrate" procedure is activated. By pressing the right arrow key 14b, the "K FACTOR" menu item is activated which allows the user to input a "k factor." The next adjacent menu item 80b allows the user to enter a "rate multiplier". The menu items 80c, 80d enable the user to program the calibration and range of the analog output signal (which is outputted by the conversion circuit 50 shown in FIG. 2A). The menu item 80e activates a diagnostics procedure in the controller.

The menu block 82 that is vertically adjacent the menu block 80, activates the totalizer programming procedure. When the user is in this menu system location, parameters relating to how the unit is to totalize the counts received at the pulse input 40 (shown on FIG. 2A) are entered. Other menu items in this row enable the user to program functions to be performed upon receiving signals at the control inputs 34 (shown in FIG. 2A) and other functions relating to totalizing and calibrations to the totalizer.

The row commencing with the menu block 84 allows the user to enter configuration information regarding the method by which the controller calculates the rate being measured, the accuracy with which the rate is displayed as well as other functions to be performed with the rate information such as the triggering of alarms, etc.

The row commencing with the menu block 86 allows the flow controller to be configured for batch operations and includes the setting of alarms, the timing of various functions and the form of information that is to be displayed during the batch process.

The uppermost row commencing with the menu block 88 includes miscellaneous programming functions including the setting of communication protocols and the storing of a password. In the disclosed system, when a user presses the keys 14a, 14b to activate the configuration mode, preferably a password check is made in which the user is asked to enter a password (indicated by the decision block 90). The entered information is compared to a stored password and if a match is found, the user is allowed to proceed into the configuration mode. This features prevents unauthorized modifications to the controller configuration.

The menu system shown in FIG. 3 has been described as one in which the menu items are arranged in a row/column matrix. The present invention also contemplates a menu system in which at least some menu blocks have sub-menu items associated with them. For example, a menu item 82a may be used to program or configure the control inputs 34 shown in FIG. 2A. The configuration would include the assigning of certain functions to be performed upon the receipt of a signal at a given control input.

To implement this feature, sub-menu items associated with the control inputs 34, are accessible by the user after the menu block 82a is activated. As seen in FIG. 3, when menu item 82a is activated, a function can be assigned to control input 1. As seen in FIG. 2A, however, there are four other control inputs which for purposes of explanation can be denoted as control inputs 2-5. In the preferred embodiment, functions are assigned to the other control inputs by pressing one of the numeric keys on the key pad 14 to designate which of the five control inputs is to be configured. Following the designation of the control input to be configured, the user can then enter or select a function to be assigned to that control input. The disclosed menu system or user interface may include sub-menu items for any of the menu blocks shown in FIG. 3.

It should be noted here that the menu items disclosed and described above are considered illustrative of the type of configurations, information and parameters that could be entered in order to configure the controller. The specific menu items described, are not part of the invention and it should be recognized that the invention is susceptible to a wide variety of applications and process control devices in which substantially different menu items would comprise the menu system. Although the invention has been described in connection with flow processes and related devices, it is adaptable to other types of process control devices such as machine controllers and production controllers that do not involve the control or monitoring of fluids or gases. The term "process control device" as used herein is intended to encompass flow, viscosity, machine, production and similar controllers.

The present invention provides a convenient user interface having a dual navigational menu system which gives the user the option of cycling or advancing through each menu item in order to configure the flow controller for the application it is being used in. To further facilitate configuration and changes to existing configuration, the system monitors the keyboard for positional data when in the configuration mode, and immediately activates a menu item that corresponds to the positional or address data entered by the user. The help message system is available for each menu item and is activated immediately upon pressing of the key 14*d* which during the configuration mode is designated as a "help" key.

Although the invention has been described with a certain degree of particularity, it should be understood that those skilled in the art can make various changes to it without departing from the spirit or scope of the invention as hereinafter claimed.

We claim:

1. A method for configuring a process control device such as a flow controller, comprising:
   a) providing a keyboard means to enable a user to input data into said device;
   b) monitoring said keyboard means to check for user input indicating that a configuration mode of operation is desired;
   c) initiating a menu driven configuration mode upon receiving configuration mode selection input from said keyboard means;
   d) while in said configuration mode, monitoring said keyboard means for entry of directional and position data;
   e) providing a menu system in said control device, said menu system comprising a menu matrix having a plurality of menu items arranged in rows and columns;
   f) activating menu items in said menu system sequentially when directional data is entered and activating a menu item directly when position data corresponding to the row and column of said menu item is entered form said keyboard means; and,
   g) accepting data from said keyboard means when a menu item has been selected and storing said data in association with said menu item.

2. The method of claim 1 further comprising the steps of:
   a) monitoring said keyboard means when in said configuration mode, for user input indicating that help information regarding a menu item is desired by the user; and,
   b) retrieving and displaying textual information relating to said menu item on a display associated with said device by retrieving said information from a information storage means forming part of said device.

3. The method of claim 1 further comprising the steps of:
   a) monitoring said keyboard means while said device is in said configuration mode, for user input representing position data for a particular menu item; and,
   b) activating the particular menu item associated with the position data entered by the user.

4. The method of claim 3 further comprising the steps of:
   a) monitoring the keyboard means for user input signals indicating that a direction key forming part of said keyboard means has been pressed; and,
   b) activating menu items sequentially in response to pressing said direction key.

5. A user interface for configuring a process control device such as a flow controller, comprising:
   a) keyboard means by which a user enters instructions and data into said device;
   b) display means for displaying alphanumeric information;
   c) means for detecting predetermined user input indicating that a configuration mode is desired;
   d) means responsive to direction keys forming part of said keyboard means during a configuration mode, for sequentially traversing a menu matrix having a plurality of menu items arranged in rows and columns;
   e) means for directly activating a menu item in said menu system by entering menu item position information comprising numeric data corresponding to the row and column position of the menu item being directly activated;
   f) address receiving means for receiving said menu item position information directly from said keyboard means;
   g) storage means for storing configuration data entered through said keyboard means;
   h) means for detecting that a help key forming part of said keyboard means has been pressed; and,
   i) means for displaying alphanumeric information in said display means corresponding to a menu item activated at the time said help key was pressed.

6. The user interface of claim 5 further including means for activating a sub-menu item associated with an activated menu item.

* * * * *